Figure 1:
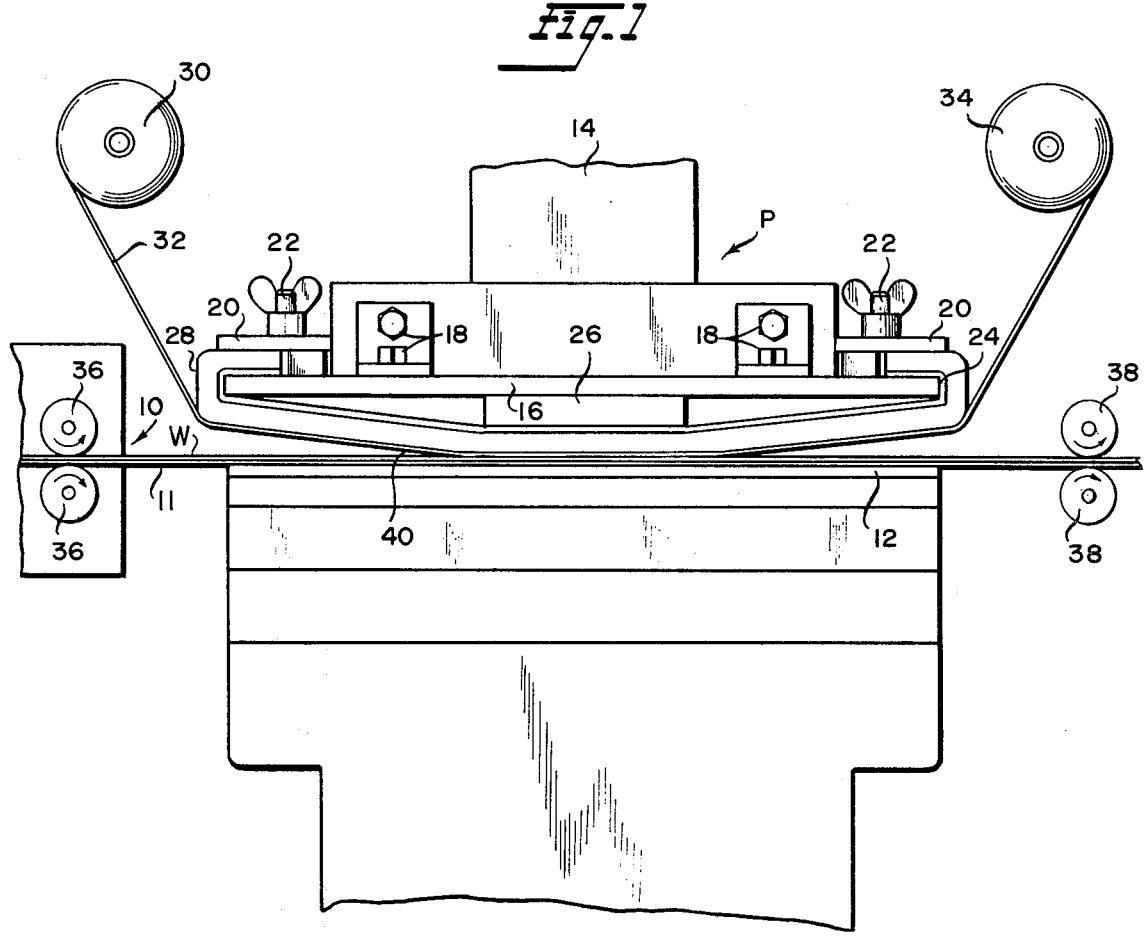

United States Patent [19]
Coffin et al.

[11] 3,996,328
[45] Dec. 7, 1976

[54] METHOD FOR FINISHING RESINOUS SURFACE COVERINGS

[75] Inventors: Robert E. Coffin, Wayne; Anthony N. Piacente, Lawrenceville, both of N.J.

[73] Assignee: Congoleum Corporation, Milwaukee, Wis.

[22] Filed: Feb. 17, 1972

[21] Appl. No.: 227,190

Related U.S. Application Data

[63] Continuation-in-part of Ser. No. 24,519, April 1, 1970, abandoned.

[52] U.S. Cl. .............................. 264/280; 264/284
[51] Int. Cl.² ......................................... B29D 7/14
[58] Field of Search ........................... 264/284, 280

[56] References Cited
UNITED STATES PATENTS

| | | | |
|---|---|---|---|
| 2,442,443 | 6/1948 | Swallow | 264/284 X |
| 2,566,982 | 9/1951 | Clemens | 264/316 X |
| 2,950,502 | 8/1960 | Weaver | 264/280 X |
| 3,157,723 | 11/1964 | Hochberg | 264/284 |

*Primary Examiner*—Richard R. Kucia
*Attorney, Agent, or Firm*—Richard T. Laughlin

[57] ABSTRACT

A method for finishing resinous sheet material wherein the sheet material is adhered to a support surface and is passed through a pressure nip having an upper hard, very smooth, resiliently backed finishing surface and a lower support surface, the outer surface of the sheet material being maintained between about 100° F and 300° F while moving through the nip, the heat being provided from previous processing steps, without adding any additional heat at the finishing step, and subsequently cooling the sheet material after it has passed through the nip.

10 Claims, 2 Drawing Figures

METHOD FOR FINISHING RESINOUS SURFACE COVERINGS

This application is a Continuation-In-Part of copending application Ser. No. 24,519, filed Apr. 1, 1970 now abandoned entitled Method and Apparatus for Finishing Resinous Surface Coverings.

This invention relates to an improved method for producing a finished surface on resinous sheet material, and more particularly, resinous surface coverings.

Recently, resinous sheet material, and more particularly, vinyl sheet material such as produced from polyvinyl chloride or copolymers of vinyl chloride and other resins such as vinyl acetate, has become extremely popular as surface covering material. One of the more common types of product is the vinyl asbestos tile wherein asbestos or talc filler is utilized with a suitable resin such as polymerized vinyl chloride. This product has found extensive use in floor coverings, and its versatility has added greatly to the popularity and demand of the product.

The vinyl wear or decorative layer may include a number of variations in color, pattern, texture, and the like. Additionally, chips of polyvinyl chloride or other resinous material have been included in a resinous matrix to provide an even greater variation. Further, techniques have been developed for producing various different appearances on the surface of the product such as a wrinkled surface, a mottled surface, a striated surface, or a polished surface.

This invention relates to a method for providing a finished surface of a unique character to a resinous sheetlike product, and particularly to a product comprising a polyvinyl chloride sheet or a polyvinyl chloride-asbestos sheetlike product.

Therefore, a primary object of this invention is to provide a method for imparting a pleasing appearance to a resinous surface covering.

A further object of this invention is to provide a method for polishing, finishing, or burnishing the surface of a resinous sheet product.

Still another object of this invention is to provide a method and apparatus which may be readily used with existing processing machinery for finishing the surface of resinous sheets.

Yet another object of this invention is to provide a method of polishing wherein the polishing surface remains stationary while the material to be polished is moved past the polishing surface while in pressure contact therewith.

Figure 2:
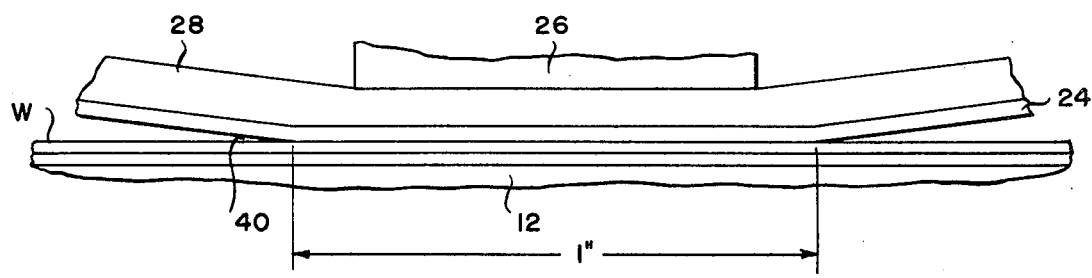

These and other objects and advantages of this invention will become apparent when considered in light of the following specification and claims, when taken together with the drawings in which:

FIG. 1 is a side elevation of the apparatus used in the performance of the method of this invention, portions being shown schematically and fragmentarily; and FIG. 2 is an enlarged fragmentary view of a portion of FIG. 1 showing the pressure nip area.

Referring now to the drawings, the apparatus of this invention is seen as comprising a C-frame press or the like generally designated P located immediately adjacent from the end of the consolidator 10. In the consolidator 10, the sheet material or work generally designated W is formed, in a manner described in copending application Ser. No. 40,269 filed May 25, 1970 and entitled Method and Apparatus for Producing Resinous Sheet-Like Products. Briefly, the method comprises depositing a quantity of resinous chips onto a moving carrier web such as a stainless steel belt and consolidating the chips under heat and pressure into a sheet. After leaving the consolidator 10, the sheet material W being supported on a belt 11, passes through the press P shown in FIG. 1. The belt 11 must have a smooth, mirror-like surface to which the sheet must adhere during processing, and from which the resinous sheet which is formed must be strippable. Preferably, the belt 11 is constructed of stainless steel, carbon steel, or heat-resistant fluorocarbon-glass fiber (glass fiber belt impregnated with a fluorocarbon resin.) It is imperative that the belt be selected so that the sheet which is formed will adhere or stick thereto during the finishing stage. As the resinous sheet and the belt emerge from the consolidator 10, the temperature range should be between 100° F and 375° F, however, preferably the temperature is between 150° F and 260° F. The temperature of the sheet W is brought about by the heat of processing during the formation of the sheet from the resinous chips, and it is not necessary to add additional heat at the finishing stage.

When the sheet material W and the belt 11 to which it is adhered emerge from the consolidator, the sheet W and Belt 11 pass through the press P over the lower press platen 12. Positioned above the platen or support member 12 is a movable upper platen 14 which carries at its lower end a steel plate 16, plate 16 being suitably attached to the upper platen 14 as by bolts 18. Fastened to the steel plate 16 as by clamps 20 and bolts 22 is a back-up member or press platen 24. At the central portion of the back-up member 24 is a filler block 26 which serves to space the back-up member 24 from the steel plate 16. Positioned against the back-up member 24 and also secured by clamps 20 is a resilient pressing member 28. Pressing member 28 may comprise any suitable resilient type of material, but it should be heat resistant since the resinous sheet W being processed is at an elevated temperature. The preferred type of resilient material would be a silicone sponge material.

Adjacent to the left side of the press P as seen in the drawings is a roll 30 which carries the polishing or finishing web 32 which will be described below. Polishing web 32 passes beneath the resilient pressing member 28 to a take-up roll 34. Rolls 30 and 34 are supported by suitable means (not shown) which may be secured to the upper platen 14. Web 32 should have a very smooth or highly polished slippery surface for contacting the sheet material W. In the preferred embodiment, the web 32 is a glass fiber belt having a fluorocarbon coating such as a poly tetrafluoro alkylene thereon. A suitable coating material would be poly tetrafluoroethylene such as the type marketed by E. I. DuPont de Nemours & Company, Inc. under the trademark TEFLON. An alternate form of the web would be a highly polished metal surface such as a chrome or stainless steel belt.

In operation of the press, the web 32 remains stationary, however, rolls 30 and 34 permit ready renewal of the working area of the web 32 as wear develops.

OPERATION OF THE INVENTION

In operation, a suitable means such as the cooperating rolls 36 and 38 as well as the driving rolls of the belt 11 are provided for moving the sheet material W through the press P. The sheet material leaves the consolidator 10 at an elevated temperature, but below the melting point of the resin layer. Press platen 14 is lowered so as to exert pressure through the back-up member 24, the resilient pressing member 28, and the polishing web 32 against the sheet material W. Rolls 36 and 38 as well as the drive rolls (not shown) of the continuous belt 11 feed and pull the sheet material W and the belt 11 through the nip 40 formed by the finishing web 32 and the support member 12. Because of the very slippery surface on the finishing web 32, the degree of friction imparted by the web 32 is reduced. Since the web W is adhered or stuck to the belt 11, no slippage between the web W and the belt 11 occurs. If the web W were not supported and adhered to the belt 11, a back-up of the web W would occur immediately ahead of the pressure nip 40 resulting in a reduced quality product.

Because of the pressure exerted perpendicular to the sheet material W at the nip 40, a plastic deformation of the surface of the sheet material W takes place. The material closest to the surface of the sheet W tends to slide with respect to the material just below it, and a very smooth and unique finish is imparted to the sheet material W.

It has been found desirable to maintain the area of contact at the nip 40 between the finishing web 32 and the work W about 1 inch in the longitudinal direction of travel of the web as best illustrated in FIG. 2. This provides a minimal contact area and yet permits good finishing of the product without undue heat build-up or other deformation of the web W.

Since the finishing web 32 is stationary during the operation of the invention, the efficiency of the finishing surface at the area of contact may be reduced because of wear. It then becomes necessary to renew the surface. This is accomplished by raising the press slide 14 to provide a clearance between the web 32 and the sheet material W. When the press slide 14 is raised, rolls 30 and 34 may be rotated to incrementally advance the finishing web 32. This provides a new surface for finishing the sheet material W, and only a minimal amount of time is necessary to thus change the work-contacting portion of the web 32.

Throughout the specification and claims of this application, the term "resinous" is used to include a number of materials upon which the method of this invention may be utilized to finish the same, provided the particular composition selected can be formed into a film. Such compositions can include a resin, plasticizers, stabilizers, fillers and pigments. Suitable resins which may be used in the formation of sheets to be finished by this method are preferably thermoplastic resins. The preferred and most widely used resin for surface coverings are polymers of vinyl chloride. The vinyl chloride polymers can either be simple, unmixed homopolymers of vinyl chloride or copolymers, terpolymers, or the like thereof in which the polymeric structure of vinyl chloride is interspersed at intervals with the residues of other ethylenically unsaturated compounds polymerized therewith. Suitable extraneous comonomers include for instance, vinyl esters such as vinyl bromide, vinyl fluoride, vinyl acetate, vinyl chloroacetate, vinyl butyrate, and other fatty acid vinyl esters, such as vinyl alkyl sulfonates, trichloroethylene and the like; vinyl ethers such as vinyl ethyl ether, vinyl isopropyl ether, vinyl chloroethyl ether and the like, cyclic unsaturated compounds such as styrene, the mono- and polychloro styrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethylmaleate, diethylfumurate and the like; vinylidene compounds such as vinylidiene chloride, vinylidene bromide, vinylidene fluorochloride and the like; unsaturated hydrocarbons such as ethylene, propylene, isobutene and the like; allyl compounds such as allyl acetate, allyl chloride, allyl ethylether and the like; and conjugated and cross-conjugated ethylenically unsaturated compounds such as butadiene, isoprene, chloroprene, 2,3-dimethyl-butadiene-1,3-piperylene, divinyl ketone and the like. Additionally, homopolymers of unsaturated hydrocarbons such as ethylene and propylene, acrylics such as methylmethacrylate, ethyl methacrylate, and the like, cellulose resins such as cellulose acetate, cellulose acetate butyrate, cellulose acetate propionate, and cellulose nitrate, phenoxy resins such as copolymers of bisphenol and epichlorohydrin can be utilized.

Furthermore, the method of this invention could be utilized on thermosetting resins if they are finished prior to the setting or curing of the resin, i.e., while the resin is still somewhat thermoplastic. Suitable thermosetting resins which could be finished by the method of this invention before they are cured are the phenolic resins such as phenol formaldehyde, phenofurfural, alkyd resins as produced by the reaction of dibasic acids or anhydrides such as maleic or phthalic with polyhydric alcohols such as glycerol, amino resins such as produced by the reaction of amines such as urea and melamine with aldehydes such as formaldehyde; polyesters such as polyethylene terephthalate, epoxy resins such as produced by the reaction of epichlorohydrin and bis phenol A, polyurethane resins as either polyether or polyesters produced by the reations of diisocyanates such as toluene diisocyanate or diphenyl methane-4,4'-diisocyanate with alcohols, or silicone resins such as polymers of organo siloxines.

The particular resin which may be finished by the method of this invention, however, is one which must adhere or stick to the carrier belt 11, and must have sufficient heat retained therein to undergo plastic deformation at its surface without the addition of heat at the finishing stage. Thermosetting resins which have been cured or heat set could not be finished by this method, obviously. Furthermore, the resin must be one which may be formed as a sheet prior to the finishing stage.

After the sheet material W has been finished as heretofore described, it is cooled, preferably by directing a stream of a liquid coolant against the underside of belt 11. Although other cooling means may be utilized, this technique provides an added benefit to the process in that it results in releasing the sheet W from the belt 11. The coolant utilized may be chilled water, although a solution of ethylene glycol in water or ethanol in water is desirable as lower coolant temperatures would then be possible than with pure water.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A method for finishing resinous sheet material in a thermoplastic state comprising:
   a. adhering the resinous sheet material to a carrier support web, to which said resinous sheet material will adhere and from which it can be stripped, by pressing said resinous sheet material against said web at an elevated temperature within the range of 100°–375° F at which said resinous sheet material is heat softened,
   b. moving said adhered resinous sheet material and said carrier support web between a smooth, resiliently backed stationary finishing surface and a stationary support surface so that said finishing surface contacts the surface of said adhered resinous sheet material,
   c. forming a pressure nip between said surfaces by applying a pressure force perpendicular to said sheet material,
   d. maintaining the surface of said resinous sheet material at a temperature at which it is in a thermoplastic state while being moved through said pressure nip without the addition of heat to the resinous sheet material at said pressure nip,
   e. whereby said perpendicularly applied pressure force causes the material closest to the surface of said resinous sheet material to be displaced longitudinally from the material just below it thereby producing a plastic deformation of the surface of said sheet material by the sliding action of the surface of the sheet material relative to the material directly below it,
   f. cooling said resinous sheet material subsequent to movement through said pressure nip, and
   g. stripping said resinous sheet material from said carrier support web subsequent to said cooling.

2. A method as in claim 1 and wherein:
   a. said cooling effects a release of said resinous sheet material from said carrier support web.

3. A method as in claim 1 and including:
   a. maintaining the outer surface of said sheet material at a temperature of at least 100° F during passage through said pressure nip.

4. A method as in claim 1 and wherein:
   a. said resinous sheet is formed of a thermosetting resin.

5. A method as in claim 4 and including:
   a. heating said sheet material after passage through said nip and prior to said cooling for curing said thermosetting resin.

6. A method as in claim 1 and wherein:
   a. said resinous sheet material is formed of a thermoplastic resin.

7. A method as in claim 6 and including:
   a. maintaining said sheet material at a temperature of above about 150° F and below the melting point of said thermoplastic resin during passage through said nip.

8. A method as in claim 4 and including:
   a. maintaining said sheet material at a temperature of above about 150° F and below the setting temperature of said thermosetting resin during passage through said nip.

9. A method as in claim 1 and including:
   a. maintaining a pressure contact area of about one inch in the direction of travel of said sheet of said finishing surface on said resinous sheet material at said nip.

10. A method as in claim 1 and including:
    a. moving said resinous sheet material and said carrier support web at a speed of between about 20 feet per minute and about 150 feet per minute.

* * * * *